(12) United States Patent
Singh et al.

(10) Patent No.: US 8,647,770 B2
(45) Date of Patent: Feb. 11, 2014

(54) BISMUTH-TIN BINARY ANODES FOR RECHARGEABLE MAGNESIUM-ION BATTERIES

(75) Inventors: Nikhilendra Singh, Ypsilanti, MI (US); Masaki Matsui, Mie (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 44 days.

(21) Appl. No.: 13/483,388

(22) Filed: May 30, 2012

(65) Prior Publication Data

US 2013/0323581 A1 Dec. 5, 2013

(51) Int. Cl.
H01M 4/38 (2006.01)
H01M 10/40 (2006.01)

(52) U.S. Cl.
USPC .................. 429/218.1; 429/178; 429/188

(58) Field of Classification Search
None
See application file for complete search history.

(56) References Cited

U.S. PATENT DOCUMENTS

| | | | |
|---|---|---|---|
| 2,683,184 A | 7/1954 | Boswell | |
| 2,934,583 A | 4/1960 | Stevens | |
| 5,039,576 A | 8/1991 | Wilson | |
| 5,510,046 A | 4/1996 | Li et al. | |
| 5,518,838 A | 5/1996 | Bai et al. | |
| 6,316,141 B1 | 11/2001 | Aurbach et al. | |
| 6,864,522 B2 | 3/2005 | Krieger et al. | |
| 6,955,866 B2 | 10/2005 | Nimon et al. | |
| 7,488,526 B2 | 2/2009 | Hayashi et al. | |
| 7,871,727 B2 | 1/2011 | Obrovac et al. | |
| 2003/0064292 A1 | 4/2003 | Neudecker et al. | |
| 2003/0066759 A1* | 4/2003 | Hardee et al. | ................. 205/565 |
| 2005/0069776 A1 | 3/2005 | Holl et al. | |
| 2005/0175900 A1 | 8/2005 | Yasuda et al. | |
| 2005/0271796 A1 | 12/2005 | Neudecker et al. | |
| 2006/0222955 A1 | 10/2006 | Ogawa et al. | |
| 2006/0292450 A1 | 12/2006 | Nakanishi et al. | |
| 2007/0172737 A1 | 7/2007 | Oki et al. | |
| 2008/0182176 A1 | 7/2008 | Aurbach et al. | |
| 2008/0226983 A1 | 9/2008 | Odani et al. | |
| 2009/0264295 A1 | 10/2009 | Nardelli et al. | |
| 2009/0311608 A1 | 12/2009 | Hirose et al. | |
| 2010/0124706 A1 | 5/2010 | Hirose et al. | |
| 2010/0136438 A1 | 6/2010 | Nakayama et al. | |
| 2011/0214895 A1 | 9/2011 | Ihara et al. | |
| 2011/0250509 A1 | 10/2011 | Yamaguchi et al. | |
| 2011/0311880 A1 | 12/2011 | Matsui | |

FOREIGN PATENT DOCUMENTS

WO   WO-2009008232 A1   1/2009
WO   WO-2011132065 A1   10/2011

* cited by examiner

Primary Examiner — John S Maples
(74) Attorney, Agent, or Firm — Gifford, Krass, Sprinkle, Anderson & Citkowski, P.C.

(57) ABSTRACT

A rechargeable magnesium-ion battery includes a first electrode, a second electrode, and an electrolyte layer between the first electrode and the second electrode. The electrolyte includes a source of magnesium ions, such as a magnesium salt. The first electrode includes an active material, the active material including tin and bismuth, for example as a binary combination of Sn and Bi, such as a solid solution or intermetallic compound.

18 Claims, 5 Drawing Sheets

BISMUTH-TIN BINARY ANODES FOR RECHARGEABLE MAGNESIUM-ION BATTERIES

FIELD OF THE INVENTION

The invention relates to rechargeable magnesium-ion batteries.

BACKGROUND OF THE INVENTION

Lithium-ion batteries have found widespread applications. However, improved batteries with higher volumetric energy-densities may allow further use of batteries in various applications, including automobiles.

SUMMARY OF THE INVENTION

Examples of the present invention include a magnesium-ion ($Mg^{2+}$) rechargeable (secondary) battery having a first electrode and a second electrode. In some examples, the first electrode includes an active material including bismuth (Bi) and tin (Sn), the first electrode being an anode, the negative electrode for discharge cycle. The active material may be a binary combination of Bi and Sn, and may include a mixture of Bi and Sn regions, a binary solid solution, an intermetallic compound, or some combination thereof. In some examples, the anode includes a bismuth-tin (Bi—Sn) intermetallic compound.

Examples of the present invention include a high capacity Bi—Sn anode binary active material combining the great reversibility of bismuth (Bi) and the excellent capacity of tin (Sn), for use in rechargeable magnesium-ion batteries, the anode binary active material acting as an $Mg^{2+}$ ion host material.

An example magnesium-ion battery includes an anode support, an anode, an electrolyte layer, a cathode, and a cathode support. The anode and the cathode supports may comprise a metal, and may be part of a battery housing and allow electrical contact to the battery. Hence, the anode and cathode supports may also be the battery terminals. The anode may be fabricated using Bi and Sn, for example using sputtering or any other appropriate deposition process. In some examples, the anode active material may be formed directly on the battery anode terminal, the outside surface of the terminal providing an electrical contact for the battery, and the inner surface of the terminal acting as the anode support on which the active material is deposited.

An anode may include an active material that includes Bi and Sn, for example as a binary combination of Bi and Sn. An anode may include Bi—Sn binary alloys, for example as a solid solution of one metal in the other. An anode may include discrete clumps of Bi and/or Sn, and may include nanoparticles of Bi and Sn. In some examples, the anode active material includes a Bi—Sn binary intermetallic compound, for example of the form $Bi_{1-x}Sn_x$. In some examples, an intermetallic compound may not be exactly stoichiometric or have long range crystalline properties, but may approximate such a material.

A battery has an electrolyte layer between the first and second electrodes, i.e. between the anode and cathode. The electrolyte layer may include a source of magnesium ions ($Mg^{2+}$), such as a magnesium compound, in particular a magnesium salt. The magnesium compound may be dissolved in a non-aqueous solvent, such as an organic solvent, for example tetrahydrofuran (THF). The counter ion may be trifluoromethanesulfonimide (TSFF), perchlorate ($ClO_4^-$), hexafluorophosphate ($PF_6^-$), or other counter ion, preferably being a counter ion having high oxidation stability. In other examples, the electrolyte includes a magnesium ion within an ionic liquid, for example as a solution of an ionic magnesium compound in an ionic liquid (or molten salt).

In some examples, the electrolyte layer may include a spacer or separator to prevent physical and hence electrical contact between the anode and cathode. In some examples the electrolyte layer may include a polymeric ion-conductive layer, conductive to magnesium ions.

Examples of the present invention include a Bi—Sn binary anode capable of undergoing insertion and extraction of magnesium ions through the formation of fully magnesiated Bi and Sn phases during the discharge cycle. Such a material may combine the advantageous reversibility of Bi anodes and the high capacity of Sn anodes into a single material.

A method of preparing a magnesium-ion battery includes depositing Bi and Sn on an electrode support so as to form a binary active material of Bi—Sn, for example including an intermetallic film having the composition $Bi_{1-x}Sn_x$. Further, the film may be used as an anode assembly of an improved magnesium battery, further including providing an electrolyte and a cathode so as to form the magnesium-ion battery.

An improved method of operating a magnesium-ion battery includes providing an anode including Bi and Sn, an electrolyte including magnesium ions, and a cathode, and obtaining electrical energy by storing magnesium ions in the anode. Magnesium ion storage may include formation of magnesiated compounds of Bi and Sn, in some examples fully magnesiated compounds.

BRIEF DESCRIPTION OF THE FIGURES

FIG. 3 shows scanning electron microscopy (SEM) images of various stages during the insertion of magnesium ions into the film, where

DETAILED DESCRIPTION OF THE INVENTION

Figure 1:
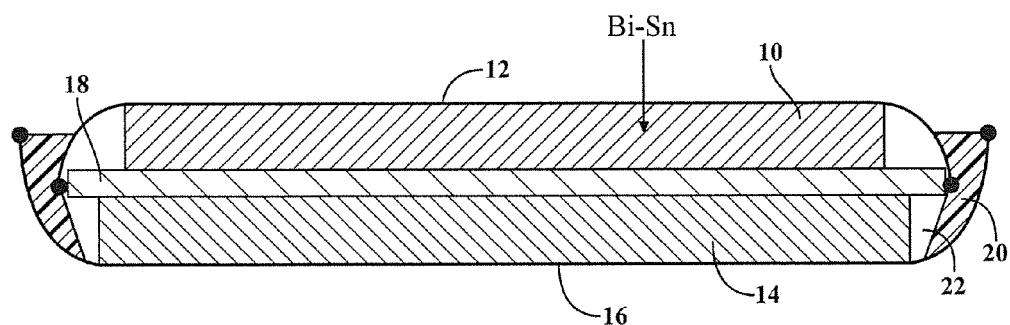
FIG. 1 shows an example magnesium-ion battery.

Examples of the present invention include a magnesium-ion (Mg-ion) battery having an electrode including a binary mixture of bismuth (Bi) and tin (Sn). A binary active material of Bi and Sn may be indicated as a Bi—Sn electrode. For example, an electrode may include Bi and Sn combined into a binary intermetallic compound, for example one having the composition $Bi_{1-x}Sn_x$, where 0<x<1. However, a Bi—Sn electrode may include Bi and Sn in a non-intermetallic phase, for example as a mixture of Bi and Sn powders, such as nanoparticles. The atomic ratio of Bi and Sn may be in the range Bi:Sn 1:99 to 99:1, such as 5:95 to 95:5, the composition of the electrode being chosen in view of the desired balance between the higher capacity of Sn and the improved reversibility of Bi.

An electrode of an improved magnesium-ion battery includes two materials that individually act as electrode active materials. The combination allows a single electrode, such as an anode, to provide the advantages associated with each individual species. An electrode active material including Bi and Sn, for example as a binary alloy and/or intermetallic compound, allows battery capacity and reversibility to be traded off in a controlled manner. This gives considerable advantages over conventional batteries in which a single species of electrode active material is used.

Rechargeable magnesium (Mg)-ion batteries show promise as high energy battery systems, due to the high capacity density available via a two electron transfer per Mg ion. Mg metal anodes display 3833 Ah/L of theoretical capacity density while Li metal anodes only display 2061 Ah/L. The development of high voltage and high capacity Mg-based batteries poses a significant challenge for the development of electrodes and electrolytes, alike. Tetrahydrofuran (THF) based organohaluminates have been used as electrolytes, but high oxidation stability ionic electrolytes are not feasible with Mg metal anodes, due to the formation of a $Mg^{2+}$ blocking layer on the Mg metal surface.

Using a Mg-ion insertion anode, instead of a Mg metal anode, allows the use of high oxidation stability electrolytes such as magnesium salts of $TSFI^-$ ($Mg(TFSI)_2$, magnesium bistrifluoromethanesulfonimide), $ClO_4^-$, and $PF_6^-$. The use of such insertion anodes may lower the energy density of the battery compared with Mg metal, and anodes may undergo some volume expansion and subsequent pulverization during the $Mg^{2+}$ insertion/extraction processes. However, Mg-ion insertion anodes allow a larger potential to be achieved, and allow use of ionic electrolytes including $TSFI^-$, $ClO_4^-$, and $PF_6^-$ ions.

In U.S. Pat. No. 6,316,141, Aurbach et al. reported a rechargeable Mg-ion battery using $Mo_3S_4$ as a cathode. This cathode showed good cyclability, but apparently only showed 77 $mAhg^{-1}$ (approx. 310 Ah/L) capacity, when theoretically it should display 122 $mAhg^{-1}$ (approx. 490 Ah/L). Examples of the present invention may use a $Mo_3S_4$ cathode, or other ion-insertion cathode such as another Mg-ion intercalating Chevrel-phase material. Replacing a Mg metal anode with a Mg-ion insertion anode allows a wider choice of electrolytes to be used, allowing batteries with higher operational voltage windows.

When used individually as anode active materials for a magnesium battery, Bi has excellent reversibility and performs well over hundreds of charge-discharge cycles. Sn, on the other hand, provides a much higher capacity than Bi, but has relatively poor reversibility and in thick planar films may degrade in 10-15 cycles. However, by combining Bi and Sn in an anode active material for the first time, anode active materials are described that combine the excellent reversibility of Bi and the capacity of Sn. The relative proportions of Bi and Sn may be adjusted to obtain the desired balance of reversibility and capacity.

Examples of the present invention include an anode active material formed by combining two individual anode active materials to form a binary or intermetallic anode active material. This presents two types of $Mg^{2+}$ insertion/extraction based intermetallic anode materials capable of being used with conventional ionic electrolytes for a rechargeable Mg-ion battery system. An improved magnesium-ion battery has a bismuth-tin (Bi—Sn) anode, capable of undergoing insertion/extraction of $Mg^{2+}$.

Examples of the invention include a Mg-ion battery having a bismuth (Bi)-tin (Sn) binary anode capable of undergoing insertion/extraction of $Mg^{2+}$, via the formation of fully magnesiated Bi and Sn phases during the discharge cycle. The anode active material combines the great reversibility observed with Bi anodes and the high capacity observed with Sn anodes into one material. A theoretical capacity=730.29 mAh/g is calculated for $BiSn_2$.

FIG. 1 shows an example battery, in this example having a single cell, including a Bi—Sn anode 10, anode terminal 12, cathode 14, cathode terminal 16, electrolyte layer 18 (including a separator and electrolyte), insulating seal around the edge at 20, and insulating region 22. In this specification, the term 'battery' includes both single cell and multiple cell configurations.

As shown in FIG. 1, the anode terminal 12 and cathode terminal 16 provide both battery terminals, effectively part of the battery housing enclosing the electrochemical compounds, and also act as the anode and cathode supports respectively. The insulating seal 20 is formed between the anode terminal and cathode terminal, sealing the battery. The separator is not shown for clarity in the illustrated battery, and may be omitted if not required.

The physical form of the battery is not limited by the illustrated example, and the battery may be a disc, block, or other physical form. A battery, as used here, includes the single-cell configuration of FIG. 1, and also multiple-cell batteries in which individual cells may be in parallel, and/or in series, electrically.

The Bi—Sn anode may be deposited by any appropriate method, such as sputtering (such as RF magnetron sputtering), or solution-based deposition techniques such as electrodeposition, or formation and deposition of powder films, for example using Bi and Sn powders, such as Bi and Sn nanoparticles. In some examples, powder films may include Bi and/or Sn containing precursors, and are converted into the metallic form by a suitable process such as heating.

Here, the team "Bi—Sn" refers to an active electrode material including both Bi and Sn, in some examples formed as an intermetallic compound or other solid solution, such as an alloy with little-long range crystalline order. In some examples, the active material of Bi—Sn electrodes includes a binary intermetallic compound of Bi and Sn, for example one having the composition $Bi_{1-x}Sn_x$, where $0<x<1$. For example, x may be in the range of 0.01 to 0.99, for example 0.05 to 0.95, in particular 0.7 to 0.3, such as 0.4 to 0.6.

In some examples, the anode may include nanoparticles (particles having a radius between 0.5 nanometers and 100 nanometers) of Bi, Sn, and/or $Bi_{1-x}Sn_x$.

The anode film may be generally planar, and in some examples may conform to the inner surface of a battery terminal. The anode may be deposited or otherwise formed directly onto the interior surface of an anode terminal. The anode terminal may be a metal sheet that also forms a portion of the battery housing and an electrical terminal of the battery.

In some examples the anode is formed by direct deposition of the anode onto the inner surface of a battery terminal, giving advantages in both weight and power density of the battery.

Any conventional cathode material can be used, such as a material capable of storing and releasing magnesium ions having a different electrochemical potential from the Bi—Sn electrode. In some examples, depending on the choice of anode, a Bi—Sn material as described herein may be used as an improved cathode. Other examples will be apparent to those skilled in the art.

Figure 2:
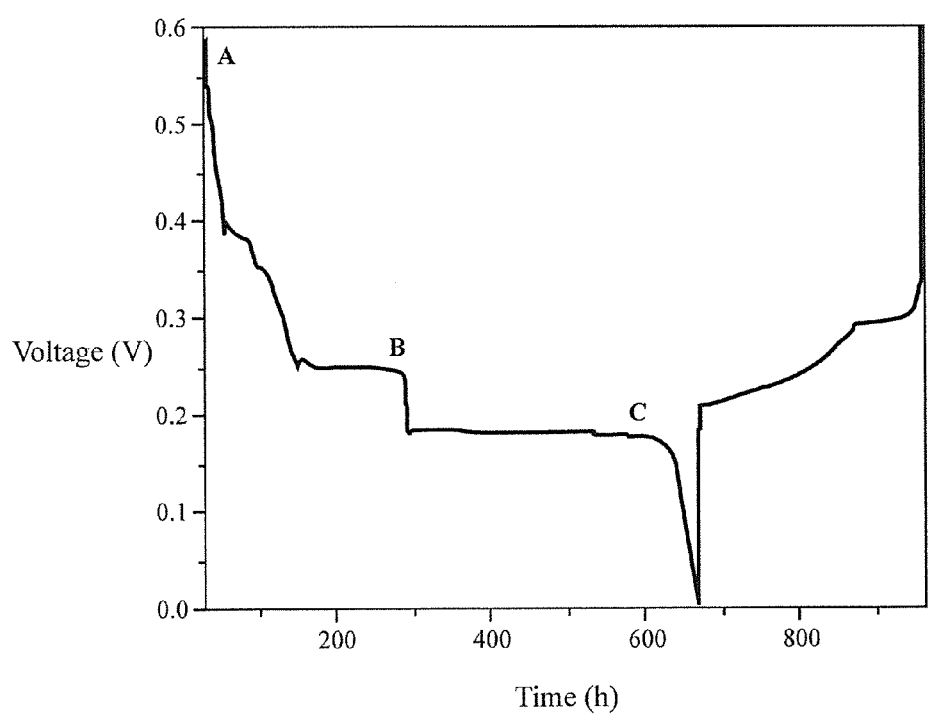
FIG. 2 illustrates insertion and extraction of magnesium ions in a Bi—Sn film.

FIG. 2 illustrates the voltage in volts, for insertion and extraction of magnesium ions into a Bi—Sn film. The lettered portions A, B, and C correspond to FIGS. 3A, 3B, and 3C as described further below, and represent the as-deposited film at A, formation of magnesiated bismuth compounds at B, and formation of magnesiated tin compounds at C.

In anode fabrication, Bi and Sn were co-sputtered on to a copper foil (0.1 mm thick) substrate using RF magnetron sputtering. All Bi—Sn anodes were sputtered to a thickness of 200 nm using 12 W target power for Bi and 30 W target power for Sn, under 3 mtorr argon pressures at room temperature. Variation in applied gun powers enables the formation of $BiSn_2$ as the final sputtered material, and substrate rotation enabled a uniform deposition.

FIG. 2 shows the charge/discharge curves of Bi—Sn anode half cells at a C/100 rate during the first cycle on a Cu foil substrate. As seen in FIG. 2, Bi—Sn anodes are capable of $Mg^{2+}$ insertion/extraction processes while displaying high capacities and low $Mg^{2+}$ insertion/extraction potentials.

The formation of a binary system allows Bi—Sn to utilize the high capacity, low $Mg^{2+}$ insertion/extraction potentials and low polarization demonstrated by Sn while utilizing the great reversibility of Bi with regards to $Mg^{2+}$ insertion/extraction. This co-deposition of two electrode active species is a novel way to combine the advantages of two individual anode materials into an improved anode including a binary compound. An improved electrode can be fabricated by the simultaneous deposition (such as co-sputtering) of two metallic species, the metallic species combining within the electrode to form a binary intermetallic compound.

Figure 3A:
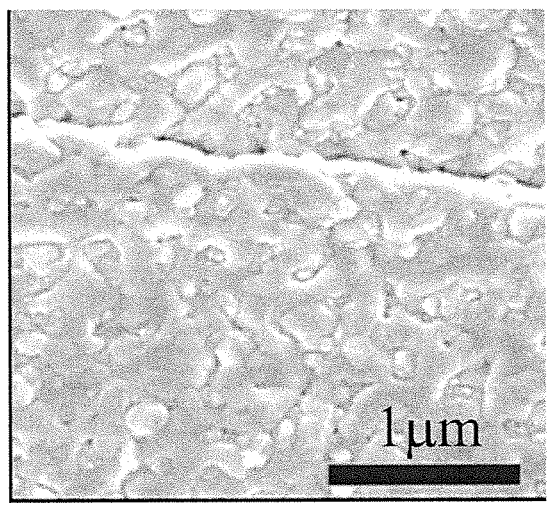
FIG. 3A shows the as-deposited Bi—Sn film.
Figure 3B:
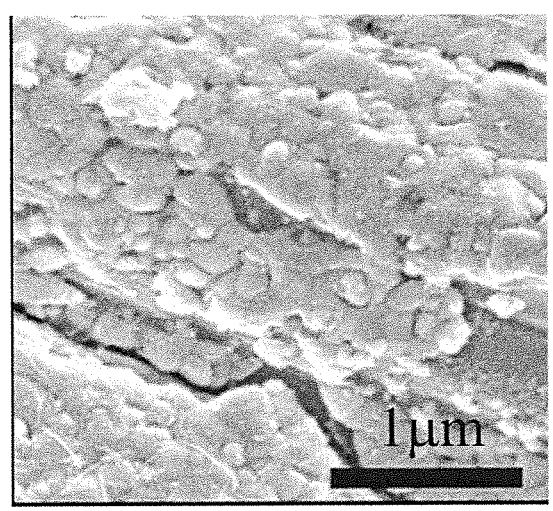
FIG. 3B illustrates formation of $Mg_3Bi_2$ during the discharge cycle.
Figure 3C:
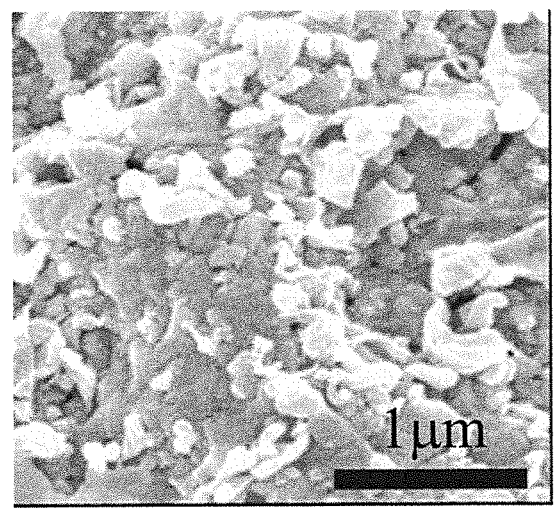
FIG. 3C shows formation of $Mg_2Sn$ during the discharge cycle. The letters A, B, and C in FIG. 2 correspond to FIGS. 3A, 3B, and 3C, respectively.

FIGS. 3A-C are scanning electron microscopy (SEM) images of the various stages during the insertion of magnesium ions into the Bi—Sn films. The figures show the morphological changes observed during the labeled steps (A-C) of $Mg^{2+}$ insertion into the binary anode material shown in FIG. 2. FIG. 3A shows the as-deposited film, FIG. 3B shows the films at the formation stage of $Mg_3Bi_2$, and FIG. 3C shows the film at the formation stage of $Mg_2Sn$. The formation of fully magnesiated compounds of both electrode active material components is highly advantageous.

Figure 4:
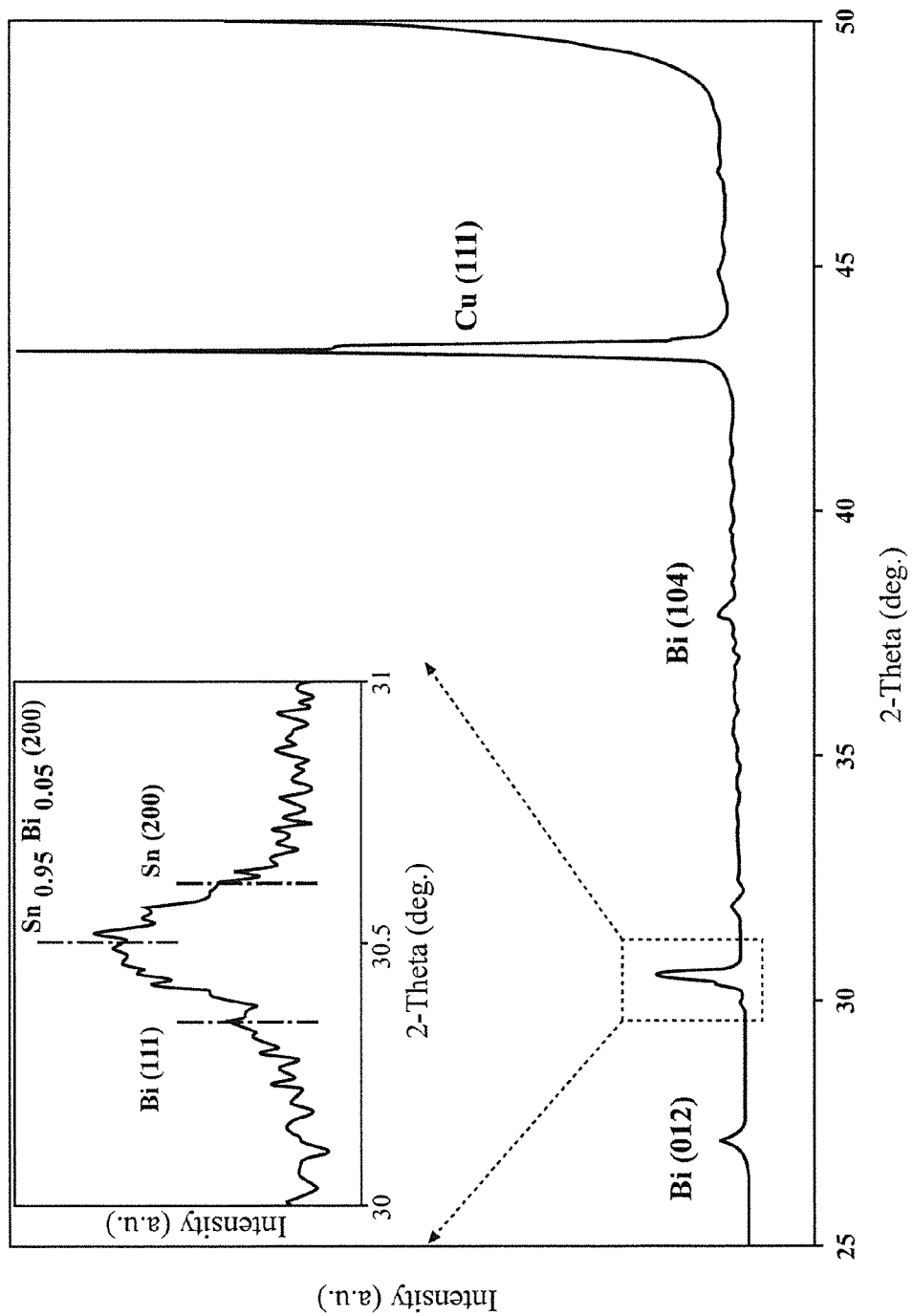
FIG. 4 shows x-ray diffraction (XRD) of as-deposited Bi—Sn films highlighting the formation of a solid solution phase. The inset shows part of the spectrum in more detail, highlighting the formation of this phase. Copper (Cu) is the substrate used.

FIG. 4 shows X-ray diffraction (XRD) of the as-deposited Bi—Sn films, showing the formation of a solid solution phase. The three-digit numbers in parentheses correspond to the crystal planes from which X-ray diffraction peak is obtained. The inset shows in more detail a peak corresponding to the intermetallic compound $Sn_{0.95}Bi_{0.05}$. Individual peaks are also observed for Bi and Sn as shown.

Figure 5:
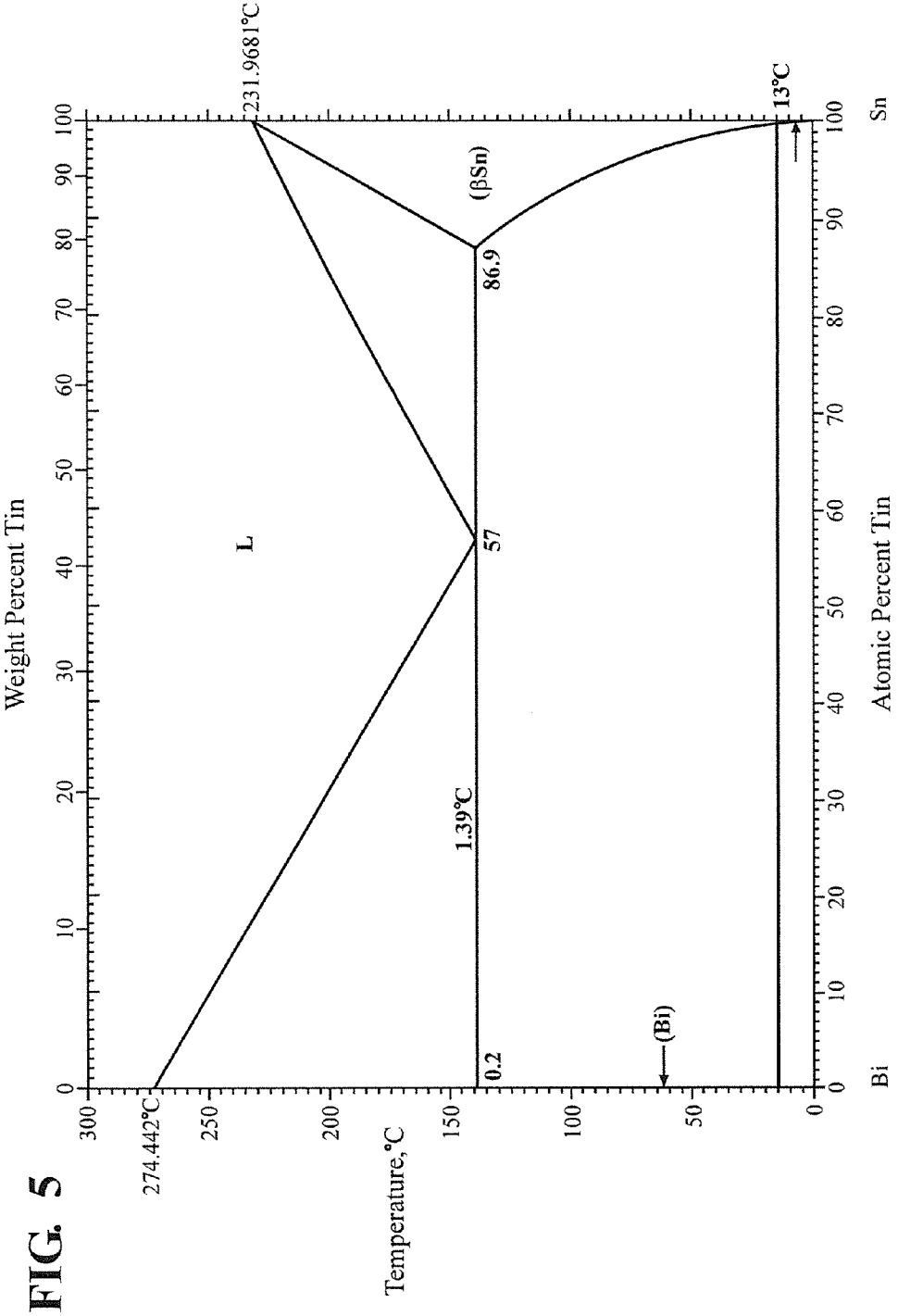
FIG. 5 shows the phase diagram of Bi—Sn solid solutions, showing a wide variety of compositions available.

FIG. 5 shows a phase diagram for Bi—Sn, showing the availability of a wide range of solid solutions between Bi and Sn for various deposition conditions. The figure shows that it is possible to obtain Bi—Sn compositional ranges over a wide range of compositions, i.e. for $Bi_{1-x}Sn_x$ for x from almost 0 to almost 1. In examples of the present invention, x may be between 0.05 and 0.5, such as 0.3 to 0.7, for example 0.4 to 0.6. In some examples x may be 0.5, corresponding to an approximate one to one atomic ratio of Bi:Sn.

For deposition at room temperature, the phase diagram of FIG. 5 suggests that a relatively low proportion of intermetallic compound will be formed, corresponding to the phase boundary with β-Sn towards the right of the figure. This is consistent with the x-ray observation of $Sn_{0.95}Bi_{0.05}$ in FIG. 4. This is also consistent with the dual plateau nature of FIG. 2, where the plateau edges may correspond to the magnesiation of Bi, followed by the magnesiation of Sn, with a relatively small contribution from the intermetallic compound. However, it is clear from the phase diagram that deposition at higher temperatures, for example between 150° C.-200° C., allows the proportion of intermetallic compound in the anode active material to be increased, and in some examples the intermetallic compound may be greater than 50% by weight in the Bi—Sn binary active material, in some cases over 80% by weight. Electrode optimization can be achieved by varying the sputtering powers and deposition temperature for the active species, or adjusting the parameters of other deposition techniques, if used.

The direct reactions between $Mg^{2+}$ and Sn to form $Mg_2Sn$, and $Mg^{2+}$ and Bi, are well understood. For an intermetallic phase, an insertion process for $Mg^{2+}$ may depend on the composition of the intermetallic phase, and formation of both magnesiated compounds is possible.

Figure 6:
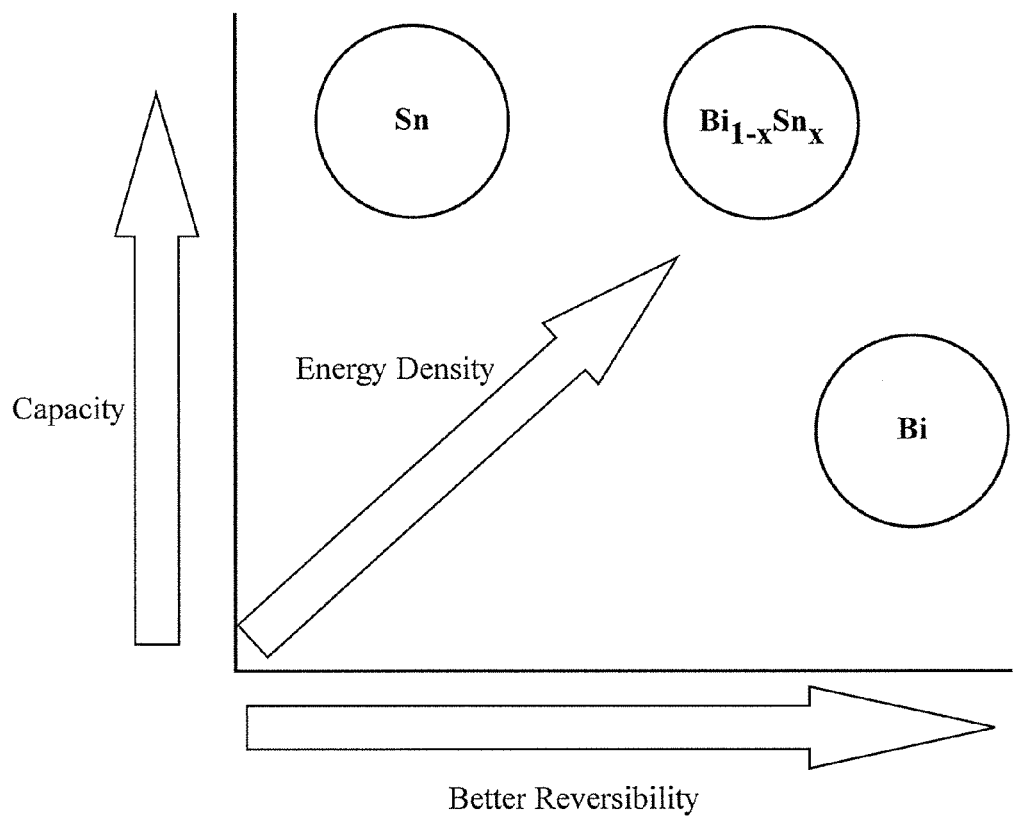
FIG. 6 is a simplified schematic illustrating how the composition of a $Bi_{1-x}Sn_x$ may be varied to obtain different relative advantages in capacity or better reversibility as required.

FIG. 6 is a schematic representation of the advantages of combining the great reversibility of Bi and high electrochemical capacity of Sn into a single anode active material. As illustrated, the Sn anode gives excellent capacity, and the Bi anode gives excellent reversibilty. An anode composition including Bi and Sn, for example $Bi_{1-x}Sn_x$, allows a desired combination of capacity and reversibility to be achieved by varying the composition. The combination of high capacity and excellent reversibility of Sn and Bi, respectively, allows improvements in energy density available. These energy densities may not be achievable using Bi or Sn alone. Further, these novel anode materials provide advantages over conventional lithium-ion batteries.

Examples of the present invention include magnesium-ion batteries including a cathode, anode, and an electrolyte including magnesium ions, where the anode includes a solid solution binary alloy of Bi and Sn. Preferably, the Bi—Sn anode active material is an intermetallic compound. Discharging and charging of the battery may include the formation and restoration (of the original anode materials) of fully magnesiated compounds of Bi and/or Sn. For example, operation of the battery may include the formation of $Mg_3Bi_2$ and/or $Mg_2Sn$.

In some examples, the improved anode active materials are deposited directly on the inner surface of a terminal. The terminal acts as both the anode support, and the external anode of the battery. Hence, separate terminal and anode support layers are not always necessary, providing an improvement in available energy density. The battery terminal may have an outer surface, providing the battery terminal, and an inner surface on which the anode active material is directly formed.

An improved Bi—Sn electrode active material can be formed by sputtering Bi and Sn together onto an anode support. In the example of magnetron sputtering, the gun power may be adjusted for each source to obtain the desired intermetallic or other solid solution composition desired. In this way, batteries having different anode compositions may be fabricated by the same equipment, while having different combinations of desirable properties such as capacity and reversibility.

In some examples, the anode active layer may be formed by electrodeposition on the inner surface of a battery terminal, or otherwise formed on the anode support layer. Electrodeposition approaches include solution-based electrosynthesis techniques that may form the anode material directly on the surface of an anode support (or current collector, which may be the interior surface of the anode terminal). A solution including both bismuth and tin ions can be used for simultaneous co-electrodeposition of the respective metals, or alternating Bi/Sn layers may be deposited by any technique and later combined by a thermal or other process. Electrodeposition can also be used to fabricate anodes with high-surface area, three-dimensional structures, for example by forming an anode layer on a ridged surface of an anode support, or other anode support layer with three-dimensional topography, for example including pillars, depressions, grating structures, and the like. The available surface area of the anode support may be at least doubled by a three-dimensional surface topography. Active materials may be nanostructured, and in some cases may be wholly or partially encapsulated, for example by carbon nanotubes, hollow micro- or nanospheres, and the like.

Sputter deposition, electrodeposition and powder films may be used to form planar and high surface area intermetallic anodes, allowing insertion/extraction of $Mg^{2+}$. Here, sputter deposition, electrodeposition and standard powder films were used to fabricate planar and high surface area intermetallic anodes, while XRD, XRF, SEM, EDS and electrochemistry may be used to analyze the insertion/extraction of $Mg^{2+}$. These improved anodes display high capacity, good cyclability, low insertion/extraction potentials for $Mg^{2+}$, and compatibility with high oxidation stability, conventional battery electrolytes.

An improved method of operating a magnesium-ion battery includes providing an anode including Bi and Sn, preferably as anode including a binary intermetallic compound of Bi and Sn, providing an electrolyte including a source of magnesium ions, providing a cathode, and then operating the battery such that magnesiated (in some cases, fully magnesiated) Bi and Sn compounds are formed during the cycling of the battery. Using a binary intermetallic anode, fully magnesiated compounds can be formed, improving the capacity and reversibility of the battery.

Examples of the present invention include batteries having one or more cells, electrically connected in parallel and/or series, in any appropriate form factor such as button cells, other round cells, cylindrical cells, rectangular or other prismatic cells, and the like. Example apparatus also include rolled-up battery forms, and combinations of a battery with a supercapacitor and/or fuel cell, and the like.

Examples of the present invention also include various electrically-powered apparatus, such as consumer electronic devices, medical devices, electric or hybrid vehicles, or other apparatus including batteries according to examples of the present invention.

Examples of the present invention include both primary and secondary batteries. Specific examples include rechargeable magnesium-ion batteries. Examples of the present invention include a magnesium-based battery, for example a rechargeable magnesium-ion battery, including an electrode active material including a binary compound and/or alloy of Bi and Sn.

Electrodes may be fabricated by any suitable method. In some examples, a paste may be formed of particles, such as microparticles or nanoparticles, of the active material, a binder, and an electron-conducting material (e.g. graphitic carbon particles or carbon black). The paste may be deposited on an electrically conducting substrate, such as an electrode support and current collector, and heat treated as necessary.

An improved process of fabricating a battery, such as a rechargeable magnesium-ion battery, includes providing first and second electrodes separated by an electrolyte, at least one electrode including a binary compound and/or alloy of bismuth and tin.

An improved method of operation of a magnesium battery includes formation of an inter-metallic compound of bismuth and magnesium such as $Mg_3Bi_2$, and an intermetallic compound of tin and magnesium such as $Mg_2Sn$, for example during the charge-discharge cycle of a rechargeable Mg-ion battery.

Examples of the present invention also include rechargeable calcium-ion batteries, in which the magnesium ions of the described rechargeable Mg ion battery examples may be substituted by calcium ions. Examples of the present invention also include rechargeable aluminum-ion batteries, in which the magnesium ions of the described rechargeable Mg-ion battery examples are substituted by aluminum ions.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. An apparatus, the apparatus being a rechargeable battery comprising:
    a first electrode, including an active material;
    a second electrode;
    an electrolyte located between the first electrode and the second electrode, the electrolyte including magnesium ions,
    the active material including a binary combination of bismuth and tin having an atomic ratio of bismuth/tin from 1/99 to 99/1,
    the active material allowing insertion and extraction of the magnesium ions during operation of the battery through formation of a magnesiated bismuth compound and a magnesiated tin compound,
    the apparatus being a rechargeable magnesium-ion battery,
    the first electrode being an anode.

2. The apparatus of claim 1, the active material including an intermetallic compound of bismuth and tin.

3. The apparatus of claim 2, the intermetallic compound of bismuth and tin having composition $Bi_{1-x}Sn_x$, where $0.01<x<0.99$.

4. The apparatus of claim 3, where $0.4<x<0.6$.

5. The apparatus of claim 1, the active material including a binary solid solution of bismuth and tin.

6. The apparatus of claim 1, the apparatus being a rechargeable battery having a charged state and a discharged state,
    the active material including the magnesiated bismuth compound and the magnesiated tin compound when the rechargeable battery is in the discharged state.

7. The apparatus of claim 6, wherein the magnesiated bismuth compound is a fully magnesiated bismuth compound, and the magnesiated tin compound is a fully magnesiated tin compound.

8. The apparatus of claim 1, the apparatus having a housing,
    the housing supporting a first terminal electrically connected to the first electrode, and a second terminal electrically connected to the second electrode, the housing providing an electrolyte seal.

9. The apparatus of claim 8, the first terminal having an exterior surface and an interior surface, the active material being deposited directly on the interior surface of the first terminal.

10. The apparatus of claim 1, the electrolyte including a non-aqueous solution of a magnesium salt.

11. The apparatus of claim 10, the magnesium salt being a compound of magnesium and a counter-ion, the counter-ion being selected from a group consisting of trifluoromethanesulfonimide ($TSFI^-$), perchlorate ($ClO_4^-$), and hexafluorophosphate ($PF_6^-$).

12. The apparatus of claim 1, where the second electrode includes a magnesium ion intercalating compound.

13. An apparatus, the apparatus being a rechargeable magnesium-ion battery comprising:
- an anode, including an anode active material;
- an anode support;
- an anode terminal, electrically connected to the anode support;
- a cathode, including a cathode active material;
- a cathode support;
- a cathode terminal, electrically connected to the cathode support;
- an electrolyte located between the anode and the cathode, the electrolyte including magnesium ions; and
- a housing, providing a seal for the electrolyte,
- an anode active material being a binary combination of bismuth and tin.

14. The apparatus of claim 13, wherein the anode active material form a magnesiated bismuth compound and a magnesiated tin compound during a charge-discharge cycle.

15. The apparatus of claim 13, the anode active material including a binary intermetallic compound of bismuth and tin.

16. The apparatus of claim 13, the anode active material including a binary alloy of bismuth and tin.

17. The apparatus of claim 13, the anode terminal having an exterior surface and an interior surface, the anode active material being formed directly on the interior surface of the anode terminal so that the anode terminal provides the anode support.

18. The apparatus of claim 13, where the cathode active material includes a magnesium ion intercalating compound.

* * * * *